Nov. 5, 1968  R. M. WARREN, JR  3,409,043
AIR CONDITIONING
Filed Oct. 19, 1965  3 Sheets-Sheet 1
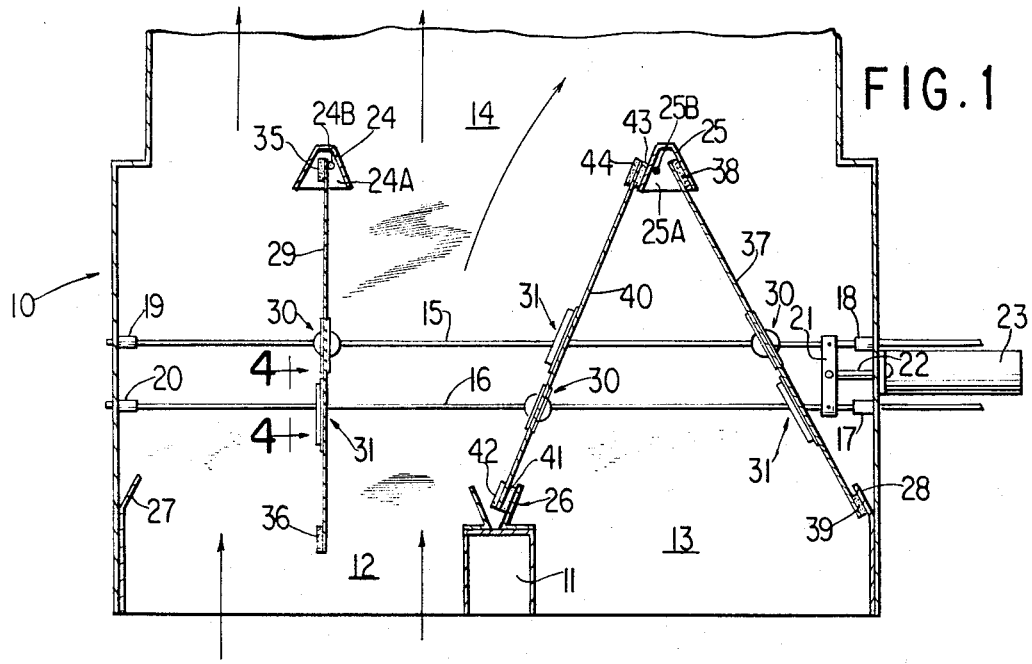
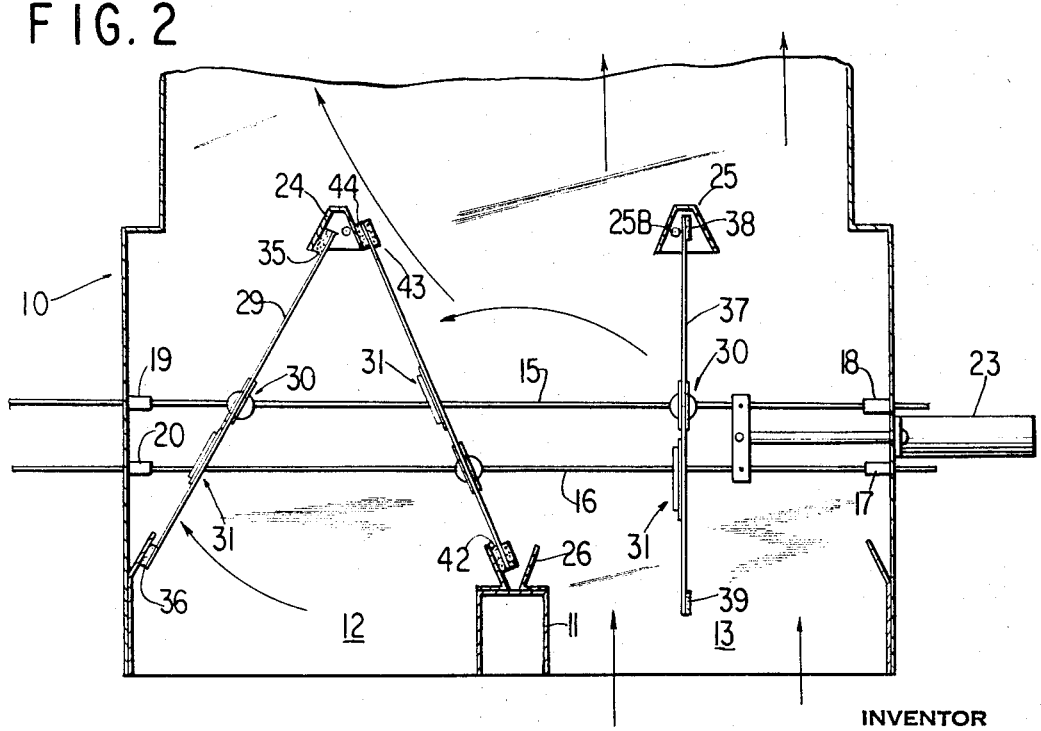
INVENTOR
ROBERT M. WARREN, JR.
BY
Robertson, Smythe, Bryan + Parmelee
ATTORNEY

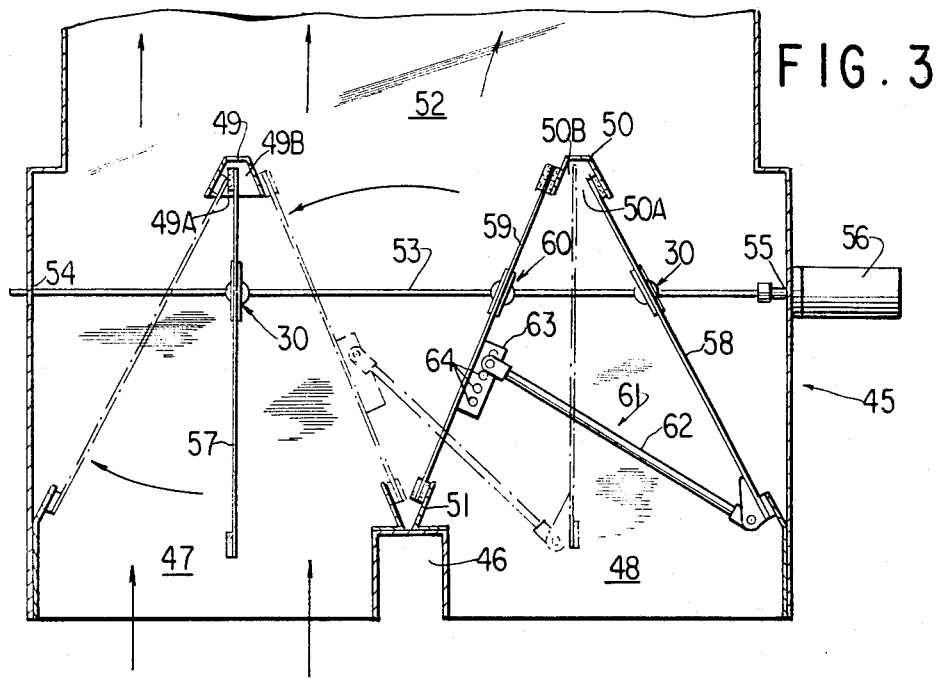
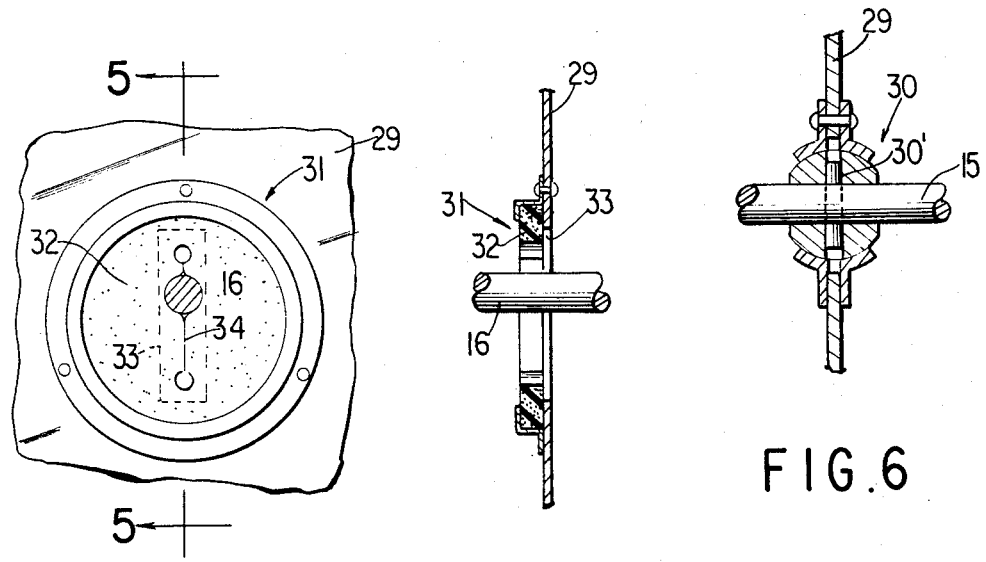

Nov. 5, 1968  R. M. WARREN, JR  3,409,043
AIR CONDITIONING
Filed Oct. 19, 1965  3 Sheets-Sheet 3

INVENTOR
ROBERT M. WARREN, JR.
BY
Robertson, Smythe, Bryan & Parmelee
ATTORNEY

United States Patent Office 3,409,043
Patented Nov. 5, 1968

3,409,043
AIR CONDITIONING
Robert M. Warren, Jr., Lincroft, N.J., assignor to Buensod-Stacey Corporation, New York, N.Y., a corporation of Ohio
Filed Oct. 19, 1965, Ser. No. 497,865
10 Claims. (Cl. 137—607)

ABSTRACT OF THE DISCLOSURE

A multi-vane mixing valve for controlling the flow of proportioned hot and cold air in an air circulating system including reciprocating rod means operable to orient multiple dampers to control the flow of air through two separate ducts into a single chamber.

This invention relates to valves for air conditioning systems and particularly to an improved multivane mixing valve.

Valves for air circulating systems are old. However, to control the flow of hot and cold air in desired proportions through such valves, relatively complex linkages have heretofore been used.

The principal object of the present invention is to provide a valve employing opposed dampers which will be of simple but reliable construction.

Another object of the invention is to provide such a valve in which a single reciprocating means operates multiple dampers to control the flow of air through two separate ducts into a single chamber of a mixing valve.

Still another object of the invention is to provide such a valve in which the multiple dampers are balanced in all positions between open and closed positions by the air passing through them or exerting pressure on them.

In one aspect of the invention, a mixing valve may comprise a housing having a partition dividing a portion of the housing into two compartments that open into a single compartment thereof.

In another aspect of the invention, one of these compartments may be connected to a hot air duct and the other may be connected to a cold air duct. The single compartment into which the two open may be connected to duct means for conducting the mixed air to a room or zone to be conditioned.

In still another aspect of the invention, there may be provided parallel damper engaging means within the single compartment and in the middle of the separate compartments leading to the single compartment.

In a further aspect of the invention, a pair of parallel bars may be mounted for reciprocating motion transversely of said single compartment. One of these bars may pivotally support two dampers in such fashion that in one end of its reciprocative stroke, one of said dampers is angularly disposed so as to cooperate with an inner side wall of said parallel damper engaging means, while the other damper is parallel to, and in the middle of, the cold air duct leading to said single compartment. In the other reciprocative end position, the reverse applies, i.e., the first damper is in the middle of the hot air duct while the other damper is angularly disposed as beforementioned.

In a further aspect of the invention, the other parallel bar pivotally supports the third damper which has one of its ends arranged to pivot about a point on the dividing partition of the valve and the other end acts on both of the parallel damper engaging means. The spacing of the parallel rods is such that the intermediate or third damper moves twice as far as do each of the other two dampers.

In a still further aspect of the invention, only a single reciprocating rod is provided for pivotally supporting three dampers, and a multiplying linkage is provided between one of the end dampers and the intermediate damper, so as to move the latter twice as far as the end dampers when the single rod is reciprocated.

In a further aspect of the invention, a single reciprocating rod may be provided for pivotally supporting four dampers such that in one position of the rod two adjacent dampers may be in parallel relation, one in the center of one of the two inlet ducts and the other inbetween the two ducts, while the other two dampers may form a V, blocking the flow of air from the other duct. In the other reciprocative position of the rod, the arrangement of the dampers is reversed.

The above, other objects and novel features of the invention will become apparent from the following specification and accompanying drawings which are merely exemplary.

In the drawings:

FIG. 1 is a sectional elevational view of a mixing valve to which the principles of the invention have been applied;

FIG. 2 is a view similar to FIG. 1 with the dampers in a different position;

FIG. 3 is a modified form of the invention;

FIG. 4 is a detail of the invention;

FIG. 5 is a section taken substantially along line 5—5 of FIG. 4;

FIG. 6 is another detail of the invention;

Figure 7:
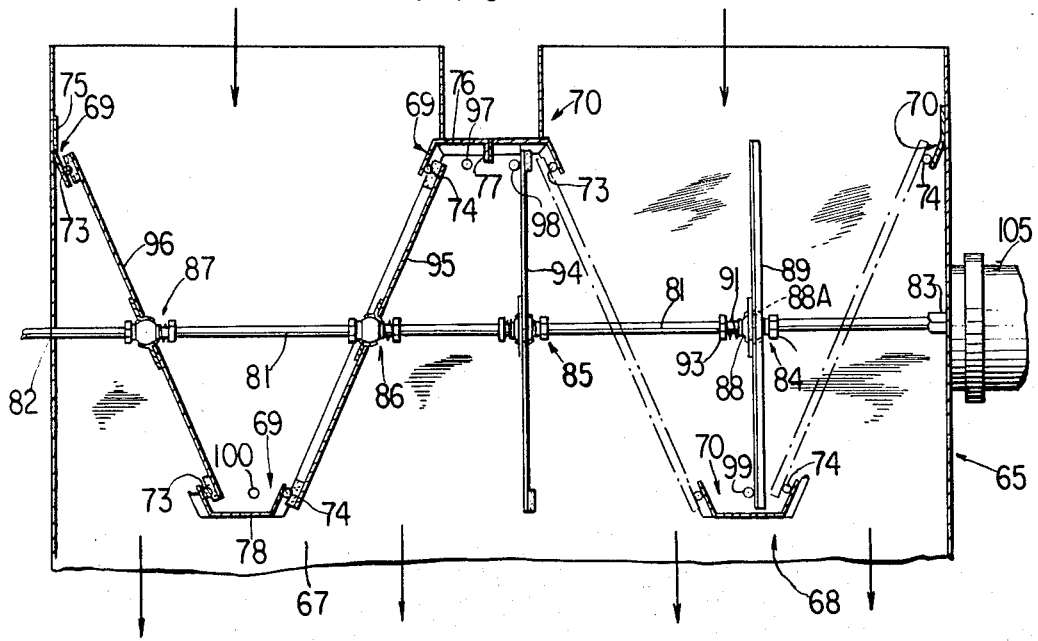
FIG. 7 is a sectional elevational view of another modified form of the invention.

Referring to the drawings, and particularly to FIGS. 1 and 2, the principles of the invention are shown as applied to a mixing valve including a housing 10. A partition 11 located centrally of housing 10 provides a cold air duct 12 and a warm air duct 13 that open into a single compartment 14.

Damper supporting, parallel rods 15 and 16 may be slidingly mounted in bearings 17, 18, 19 and 20 on opposed walls of compartment 14. A bar 21 may be rigidly connected to rods 15 and 16. It may also be connected to a piston rod 22 that extends through one side wall of chamber 14 and into a cylinder 23 fixed to the outside of said wall. Supplying pressure fluid to opposite sides of a piston within cylinder 23 causes reciprocation of rods 15 and 16 together.

Inverted channel members 24 and 25 may be mounted within chamber 14 and may extend between the opposed walls of chamber 14 other than those through which rods 15, 16 extend. The channel member 24 is in the middle of duct 12, while the channel member 25 is in the middle of duct 13. At both ends of the members 24, 25 are blocks 24A and 25A having pins 24B and 25B extending for a short distance along the members 24 and 25 and such that the pins 24B at each end of member 24 are aligned with each other as are pins 25B, all for a purpose to be described later. There is another damper engaging means 26 located along the top of partition 11; and other damper engaging means 27 and 28 are located on opposed walls of chamber 14.

A damper 29 is connected to rod 15 by a ball and socket joint 30 shown in FIG. 6. Rod 16 extends through damper 29 via a flexible joint 31. Referring to FIGS. 4 and 5, the joint 31 may comprise a piece 32 of resilient material, such as rubber or the like, that is clamped over an opening 33 in damper 29. The piece 32 may be provided with a slit 34, the edges of which remain in sealing contact with each other as well as around the rod 16. This construction permits movement of rod 16 along slit 34 while maintaining a sealing relation therewith.

In FIG. 1, one end of damper 29 includes a sealing element 35 that fits within the channel of member 24 with the back edge of damper 29 engaging pins 24B. The opposite end of damper 29 includes a sealing element 36 adapted to cooperate with member 27.

There is another damper 37 connected to rod 15 by a ball and socket joint 30, and rod 16 passes through a flexible joint 31. Damper 37 includes a seal 38 that fits within channel 25, and a seal 39 that cooperates with member 28.

A third damper 40 is connected to rod 16 with a ball and socket joint 30, and rod 15 passes through a flexible joint 31 in damper 40. There are two sealing elements 41 and 42 on the one end of damper 40 that fit within channel 26 on partition 11. There are two other sealing elements 43, 44 that cooperate with the outer surfaces of channel members 25 and 24, respectively.

With the parts in the position shown in FIG. 1, the piston within cylinder 23 is at the righthand end. In this condition all of the air passing through the mixing valve comes from duct 12. The air from duct 13 acts on substantially equal, projected areas of dampers 37 and 40. That on damper 37 acts to force rods 15 and 16 rightwardly, and that on damper 40 acts to force rods 15 and 16 leftwardly, thereby providing a balanced condition so that the force required to move rods 15 and 16 by the piston in cylinder 23 is independent of the pressure or velocity of air being supplied to ducts 12 and 13. Admitting pressure fluid to the righthand end of cylinder 23 moves the dampers to the position shown in FIG. 2 where all the air passing through the valve comes from duct 13. Other positions of the piston within cylinder 23 provide a proportional amount of air from both ducts 12 and 13, with a balanced condition of the dampers being maintained. It is noted that the spacing of rods 15 and 16 and the connection of dampers 29 and 37 to rod 15 with damper 40 connected to rod 16 provide a greater motion of damper 40 than of dampers 29 and 37.

Referring to FIG. 3, the principles of the invention are shown as applied to a mixing valve including a housing 45 similar to housing 10 shown in FIG. 1. The housing 45 also includes a partition 46 providing a cold air duct 47 and a warm air duct 48. Channel members 49, 50 and 51 are provided in chamber 52 similar to channel members 24, 25 and 26 of FIG. 1. The members 49 and 50 include means 49A, 49B, 50A and 50B for the same reason that means 24A, 24B, 25A and 25B are provided in FIG. 1. A single rod 53 is mounted for reciprocation in bearings 54 and 55, and it extends into a cylinder 56 and is connected to a piston therein. Dampers 57 and 58 are connected to rod 53 by ball and socket joints 30 as shown in FIG. 6 wherein a pin 30' connects each of the balls to rod 53.

The third damper 59 of FIG. 3 is connected to rod 53 by a ball and socket joint 60 which is similar to joint 30 except that it is not provided with pin 30' and hence is slidable along rod 53.

A multiplying linkage 61 connects damper 58 to damper 59 so that movement of damper 59 is greater than movement of damper 58 for a given movement of rod 53. This linkage includes a bar 62 having one of its ends connected to one end of damper 58, and its other end connected to point 64 on damper 59.

With the parts in their solid line position, the piston in cylinder 56 is at its rightmost position. Admission of fluid pressure to the righthand end of cylinder 56 moves the parts to their dotted line position, producing the results obtained with the valve of FIGS. 1 and 2.

It is apparent that the damper arrangement of FIG. 3 is also balanced by the air flow past it in the same way that the dampers of the species of FIGS. 1 and 2 are balanced.

Figure 8:
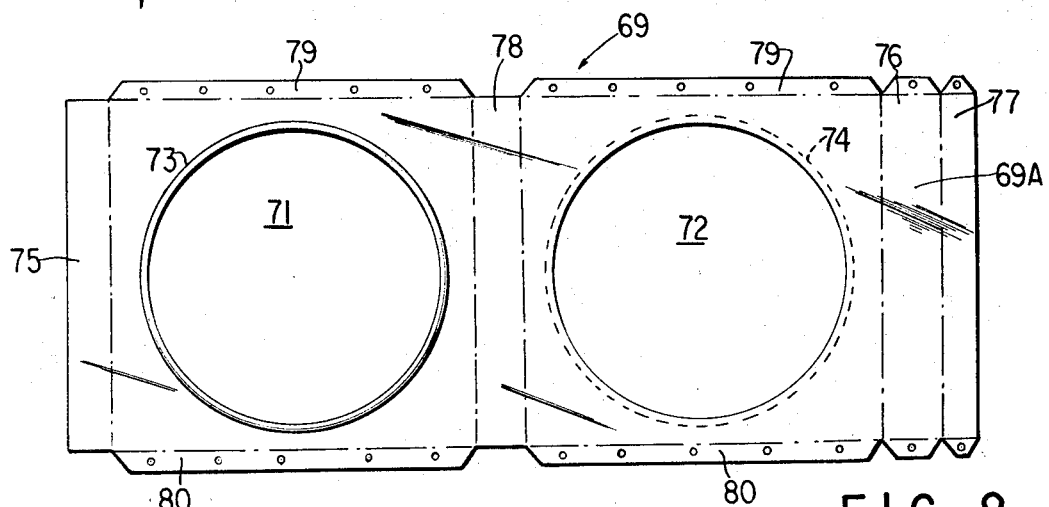
FIG. 8 is a developed view of the damper engaging means of FIG. 7.
Figure 9:
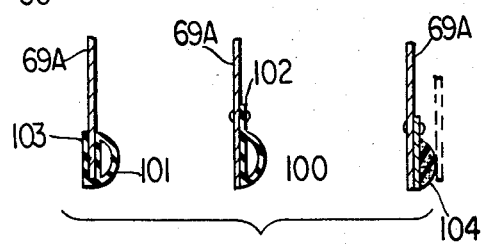
FIG. 9 is a detail of the sealing means at the end of each damper.

Referring to FIGS. 7, 8 and 9, the principles of the invention are shown as applied to a mixing valve including a housing 65 having a central partition 66 forming a hot air inlet 67 and a cold air inlet 68. Trough-like sheet metal members 69 and 70 are located, respectively, in inlets 67 and 68. Referring to FIG. 8, both members 69 and 70 are the same and, therefore, only member 69 will be specifically be described. It may include a sheet of metal 69A having spaced, circular openings 71 and 72 therein. The opening 71 may be surrounded by a galvanized bead 73 on one side of the sheet metal 69A, and opening 72 may include a similar bead 74 on the opposite side thereof. The sheet 69A may include a flange 75 that is bent to fit over one end of the one wall of housing 65 and the sheet may also include flanges 76 and 77, the former bent to form a spacer and the latter bent to fit over the end of partition 66.

The sheet 69A may also include a section 78 and flanges 79 and 80, the latter two providing supports that are attached to opposite walls of 69A that are parallel to the plane of the drawing.

A rod 81 may extend through the housing 65 and be slidingly mounted in aligned bearings 82 and 83 in opposite walls of housing 65. Rod 81 may have adjustably fixed to it four ball and socket units 84, 85, 86 and 87, all of which are identical. The units 84 and 85 are mounted on rod 81 in opposed relation to the mounting of units 86 and 87 thereon. Each unit may comprise an "Oilite" bronze ball 88 or the equivalent that seats within a sheet metal ball socket 88A attached to a damper 89 of circular dish form. An elastic stop nut 90 is fixed to rod 81, and a spring 91 acts against a collar 93, fixed to rod 81, and one side of ball 88 to force ball 88 into socket 88A and against stop nut 90. All of the units 84 to 87 are the same. The unit 85 supports a damper 94, the unit 86 supports a damper 95, and the unit 87 supports a damper 96.

Rods 97, 98, 99 and 100 may extend a short distance from the side walls of housing 65 opposite those containing bearings 82 and 83 and located as shown in FIG. 7 for the same reason that rods 24B and 25B are provided in FIG. 1.

Referring to FIGS. 7 and 9, the sealing beads 73 and 74 about each of circular openings 71 and 72 may include hollow, semi-tubular elements 101 that may have flanges 102, 103 adapted to be riveted to the sheet metal member 69A; or they may be semi-cylindrical, sponge rubber rings 104 that are riveted to 69A, all as clearly shown in FIG. 9.

Referring again to FIG. 7, the rod 81 extends through bearing 83 into a cylinder 105 where it is connected to a piston adapted to be reciprocated therein for axially shifting rod 81 between its limiting positions.

Although the various features of the improved damper means have been shown and described in detail to fully disclose several embodiments of the invention, it will be evident that changes may be made in such details and certain features may be used without others without departing from the principles of the invention.

What is claimed is:

1. A mixing valve for an air circulating system, comprising in combination a housing; a partition in said housing forming separate hot and cold air ducts leading to a single compartment in said housing; reciprocable rod means extending transversely across said separate ducts; damper means for each of said ducts, as well as one between said ducts located in said compartment; damper engaging means within said single compartment spaced from and centrally disposed with respect to the opening into said chamber; and means for reciprocating said rod means to vary the position of said damper means relative to said damper engaging means for varying the air flow into said single compartment from said separate ducts in proportion to the relative reciprocable position of said rod means.

2. A mixing valve for an air circulating system, comprising in combination a housing; a partition in said housing forming separate hot and cold air ducts leading to a single compartment in said housing; reciprocable rod means extending transversely across said separate ducts; damper means for each of said ducts, as well as one between said ducts located in said compartment, the damper means for each duct being movable from a vertical position into contact with damper engaging means on each side of housing; damper engaging means within said single compartment spaced from and centrally disposed with respect to the opening into said chamber; and means for reciprocating said rod means to vary the position of said damper means relative to said damper engaging means for varying the air flow into said single compartment from said separate ducts in proportion to the relative reciprocable position of said rod means.

3. A mixing valve for an air circulating system, comprising in combination a housing; a partition in said housing forming separate hot and cold air ducts leading to a single compartment in said housing; reciprocable rod means extending transversely across said separate ducts; damper means for each of said ducts, as well as one between said ducts located in said compartment, the damper means for each duct being movable from a vertical position into contact with damper engaging means on each side of said housing; damper engaging means within said single compartment spaced from and centrally disposed with respect to the opening into said chamber, the damper means between said ducts being movable between the damper engaging means in the middle of said ducts; and means for reciprocating said rod means to vary the position of said damper means relative to said damper engaging means for varying the air flow into said single compartment from said separate ducts in proportion to the relative reciprocable position of said rod means.

4. A mixing valve for an air circulating system, comprising in combination a housing; a partition in said housing forming separate hot and cold air ducts leading to a single compartment in said housing; reciprocable rod means extending transversely across said separate ducts; damper means for each of said ducts, as well as one between said ducts located in said compartment, the damper means for each duct being movable from a vertical position into contact with damper engaging means on each side of said housing; damper engaging means within said single compartment spaced from and centrally disposed with respect to the opening into said chamber, the damper means between said ducts being movable between the damper engaging means in the middle of said ducts; a plurality of parallel, spaced rods slidingly mounted in aligned bearings on opposed side walls of said housing, the damper means for said ducts being connected to one of said rods, and the damper means between said ducts being connected to the other of said rods; and means for reciprocating said rod means to vary the position of said damper means relative to said damper engaging means for varying the air flow into said single compartment from said separate ducts in proportion to the relative reciprocable position of said rod means.

5. A mixing valve for an air circulating system, comprising in combination a housing; a partition in said housing forming separate hot and cold air ducts leading to a single compartment in said housing; damper means for each of said ducts, as well as one between said ducts located in said compartment, the damper means for each duct being movable from a vertical position into contact with damper engaging means on each side of said housing; damper engaging means within said single compartment spaced from and centrally disposed with respect to the opening into said chamber, the damper means between said ducts being movable between the damper engaging means in the middle of said ducts; a plurality of parallel, spaced rods slidingly mounted in aligned bearings on opposed side walls of said housing, the damper means for said ducts being connected to one of said rods, and the damper means between said ducts being connected to the other of said rods, the spacing of said rods being such that movement of the damper means between said ducts moves it from contact with one to the other of said damper engaging means in the middle of said ducts when the damper means for said ducts move from the vertical to contact with the damper engaging means on opposed walls of said housing; and means for reciprocating said parallel, spaced rods to vary the position of said damper means relative to said damper engaging means for varying the air flow into said single compartment from said separate ducts in proportion to the relative reciprocable position of said parallel, spaced rods.

6. A mixing valve for an air circulating system, comprising in combination a housing; a partition in said housing forming separate hot and cold air ducts leading to a single compartment in said housing; damper means for each of said ducts, as well as one between said ducts located in said compartment, the damper means for each duct being movable from a vertical position into contact with damper engaging means on each side of said housing; damper engaging means within said single compartment spaced from and centrally disposed with respect to the opening into said chamber, the damper means between said ducts being movable between the damper engaging means in the middle of said ducts; a plurality of parallel, spaced rods slidingly mounted in aligned bearings on opposed side walls of said housing, the damper means for said ducts being connected to one of said rods by ball and socket connecting means, and the damper means between said ducts being connected by ball and socket means to the other of said rods; flexible sealing means in each damper means through which the rod not connected to that damper means passes; and means for reciprocating said parallel, spaced rods to vary the position of said damper means relative to said damper engaging means for varying the air flow into said single compartment from said separate ducts in proportion to the relative reciprocable position of said parallel, spaced rods.

7. A mixing valve for an air circulating system, comprising in combination, a housing; a partition in said housing forming separate hot and cold air ducts leading to a single compartment in said housing; damper means for each of said ducts, as well as one between said ducts located in said compartment, the damper means for each duct being movable from a vertical position into contact with damper engaging means on each side of said housing; damper engaging means within said single compartment spaced from and centrally disposed with respect to the opening into said chamber, the damper means between said ducts being movable between the damper engaging means in the middle of said ducts; a single rod slidingly mounted in aligned bearings on opposed side walls of said housing, all of said damper means being connected to said rod by ball and socket means, the one for the damper means between said ducts being slidable along said rod; multiplying linkage means between one of said duct damper means and the damper means between said ducts; and means for reciprocating said rod to vary the position of said damper means relative to said damper engaging means for varying the air flow into said single compartment from said separate ducts in proportion to the relative reciprocable position of said rod.

8. A mixing valve for an air circulating system, comprising in combination, a housing; a partition in said housing forming separate hot and cold air ducts leading to a single compartment in said housing; a single rod extending between opposed walls of said housing and mounted for reciprocable movement; four dampers pivotally mounted on said rod by ball and socket connectors, two for each of said ducts located in the openings of said ducts into said compartment; damper engaging means within said housing and arranged to orient the two dampers for one duct in a V-formation when sealingly engaged by said two dampers, closing said one duct with the two dampers of the other duct parallel to each other and opening said other duct when said rod is in one of its reciprocable positions, and the two dampers in said one duct in parallel positions, opening said one duct with the two dampers of the other duct in V-formation, closing said other duct when said rod is in another reciprocable position; and means for reciprocating said rod.

9. A mixing valve for an air circulating system, comprising in combination, a housing; a partition in said housing forming separate hot and cold air ducts leading to a single compartment in said housing; a single rod extending between opposed walls of said housing and mounted for reciprocable movement; four dampers pivotally mounted on said rod by ball and socket connectors, two for each of said ducts located in the openings of said ducts into said compartment; V-shaped, trough-like damper engaging means in each duct and arranged to orient the two dampers for one duct in a V-formation when sealingly engaged by said two dampers, closing said one duct with the two dampers of the other duct parallel to each other and opening said other duct when said rod is in one of its reciprocable positions, and the two dampers in said one duct in parallel position, opening said one duct with the two dampers of the other duct in V-formation, closing said other duct when said rod is in another reciprocable position; and means for reciprocating said rod.

10. A mixing valve for an air circulating system, comprising in combination, a housing; a partition in said housing forming separate hot and cold air ducts leading to a single compartment in said housing; a single rod extending between opposed walls of said housing and mounted for reciprocable movement; four dampers pivotally mounted on said rod by ball and socket connectors, two for each of said ducts located in the openings of said ducts into said compartment; V-shaped, trough-like damper engaging means in each duct, including circular openings in opposed side walls thereof; sealing rings surrounding said openings, the construction and arrangement of the parts being such that the two dampers for one duct are oriented in a V-formation when sealingly engaged by said two dampers, closing said one duct with the two dampers of the other duct parallel to each other and opening said other duct when said rod is in one of its reciprocable positions, and the two dampers in said one duct are oriented in parallel positions, opening said one duct with the two dampers of the other duct in V-formation, closing said other duct when said rod is in another reciprocable position; and means for reciprocating said rod.

References Cited

UNITED STATES PATENTS

| | | | |
|---|---|---|---|
| 1,915,994 | 6/1933 | Harnett | 98—38 |
| 2,976,884 | 3/1961 | Kurth et al. | 137—601 X |
| 3,123,098 | 3/1964 | Bishop | 137—601 |
| 3,261,373 | 7/1966 | Ridenour | 137—601 |
| 3,283,694 | 11/1966 | Dean | 98—38 |
| 3,331,394 | 7/1967 | Hefler et al. | 137—601 X |

WILLIAM F. O'DEA, *Primary Examiner.*

D. LAMBERT, *Assistant Examiner.*